United States Patent
Alfouzan et al.

(10) Patent No.: US 12,458,475 B1
(45) Date of Patent: Nov. 4, 2025

(54) DENTAL SYSTEM INCLUDING A CERAMIC BLOCK HOLDING ASSEMBLY AND A CERAMIC BLOCK COUPLEABLE WITH THE CERAMIC BLOCK HOLDING ASSEMBLY, AND A METHOD OF USING THE DENTAL SYSTEM

(71) Applicant: KING SAUD UNIVERSITY, Ridayh (SA)

(72) Inventors: Afnan Fouzan Alfouzan, Riyadh (SA); Huda Ahmed Al-Shehri, Riyadh (SA); Abdulaziz Rafat Alsahhaf, Riyadh (SA); Waled Mohammad Alshrani, Riyadh (SA); Sara Mohammad Al Taweel, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/826,112

(22) Filed: Sep. 5, 2024

(51) Int. Cl.
  *A61C 13/00* (2006.01)
  *A61C 13/083* (2006.01)

(52) U.S. Cl.
  CPC ........ *A61C 13/0022* (2013.01); *A61C 13/083* (2013.01)

(58) Field of Classification Search
  CPC .......................... A61C 13/0022; A61C 13/12
  See application file for complete search history.

(56) References Cited

U.S. PATENT DOCUMENTS

| | | | |
|---|---|---|---|
| 4,615,678 A | 10/1986 | Moermann et al. | |
| 5,342,696 A | 8/1994 | Eidenbenz et al. | |
| 5,490,810 A * | 2/1996 | Hahn | B28D 5/047 264/16 |
| 6,627,327 B2 | 9/2003 | Reidt et al. | |
| 6,660,400 B1 * | 12/2003 | Hintersehr | A61C 13/0003 433/167 |
| 8,251,254 B2 * | 8/2012 | Guggenmos | A61C 13/0004 221/269 |
| 8,402,624 B2 | 3/2013 | Galehr | |
| 10,945,820 B2 | 3/2021 | Deville et al. | |

(Continued)

FOREIGN PATENT DOCUMENTS

EP  1023876 A2  8/2000

OTHER PUBLICATIONS

"GCER universal bonding kit," Digital Lab Equipment, p. 98, Amanngirrbach® 2017.

*Primary Examiner* — Andrew D Graham
(74) *Attorney, Agent, or Firm* — Nath, Goldberg & Meyer; Joshua B. Goldberg

(57) ABSTRACT

A dental system includes a reusable dental block holding assembly and a ceramic block. The reusable holding assembly and the ceramic block are configured to be selectively connectable to one another. The selective connecting mechanism may include a protrusion in the ceramic block and a matching slot in the reusable holding assembly for receiving the protrusion of the ceramic block inside. A selective locking mechanism including a fastener and a plate may be used to selectively secure the protrusion of the ceramic block inside of the slot of the reusable dental block holding assembly. This configuration ensures that the ceramic block will not move relative to the holding assembly during a milling process that mills the ceramic block to form a dental crown.

14 Claims, 13 Drawing Sheets

(56) References Cited

U.S. PATENT DOCUMENTS

| | | | | |
|---|---|---|---|---|
| 2005/0276672 | A1* | 12/2005 | Prince | B23B 31/103 409/234 |
| 2008/0081311 | A1* | 4/2008 | Doumoto | A61C 13/0027 433/50 |
| 2009/0075238 | A1* | 3/2009 | Galehr | A61C 13/0022 433/213 |
| 2009/0130634 | A1* | 5/2009 | Ganley | A61C 13/0022 433/206 |
| 2009/0274994 | A1* | 11/2009 | Jung | A61C 13/0022 433/223 |
| 2010/0021859 | A1* | 1/2010 | Kopelman | A61C 9/0053 700/98 |
| 2010/0028834 | A1* | 2/2010 | Galehr | A61C 13/0022 433/213 |
| 2011/0020764 | A1* | 1/2011 | Weber | A61C 13/12 433/49 |
| 2011/0042880 | A1* | 2/2011 | Konrad | A61C 13/0022 269/287 |
| 2011/0311940 | A1* | 12/2011 | Erdelt | A61C 9/002 433/72 |
| 2012/0028214 | A1* | 2/2012 | Futterknecht | A61C 13/12 433/213 |
| 2012/0214133 | A1* | 8/2012 | Jung | B23Q 3/00 433/223 |
| 2013/0288026 | A1* | 10/2013 | Johnson | A61C 13/00 428/212 |
| 2014/0162216 | A1* | 6/2014 | Craig | A61C 13/0022 264/16 |
| 2014/0250689 | A1* | 9/2014 | Miquel | A61C 13/12 29/896.1 |
| 2014/0356798 | A1* | 12/2014 | Parker | A61C 7/16 433/2 |
| 2015/0024345 | A1* | 1/2015 | Eftekhar Ashtiani | A61C 13/0022 428/542.8 |
| 2016/0158903 | A1* | 6/2016 | Konrad | B23Q 3/103 269/309 |
| 2016/0175077 | A1* | 6/2016 | Parker | A61C 13/0022 433/8 |
| 2016/0278891 | A1* | 9/2016 | Sellers | B23Q 3/061 |
| 2017/0035537 | A1* | 2/2017 | Leeson | A61C 13/083 |
| 2017/0143456 | A1 | 5/2017 | Carden et al. | |
| 2017/0319303 | A1* | 11/2017 | Schelling | A61C 5/77 |
| 2018/0110586 | A1* | 4/2018 | Mashio | B24B 29/02 |
| 2018/0140395 | A1* | 5/2018 | Xam-Mar Mangrane | A61C 8/006 |
| 2021/0259815 | A1* | 8/2021 | Geier | B23Q 3/062 |
| 2022/0054241 | A1* | 2/2022 | Nagasawa | A61C 13/0022 |
| 2023/0286090 | A1* | 9/2023 | Bitar | B23Q 3/062 |

\* cited by examiner

DENTAL SYSTEM INCLUDING A CERAMIC BLOCK HOLDING ASSEMBLY AND A CERAMIC BLOCK COUPLEABLE WITH THE CERAMIC BLOCK HOLDING ASSEMBLY, AND A METHOD OF USING THE DENTAL SYSTEM

TECHNICAL FIELD

The present disclosure relates to dentistry, and more particularly, to a dental system including a ceramic block holding assembly and a ceramic block that are selectively coupleable to one another, and a method of using the dental system.

DISCUSSION OF THE RELATED ART

Conventionally, dental ceramic crowns have been fabricated by using a standardized technique that involves obtaining an imprint (or impression) of a prepared tooth. The prepared tooth acts as a base for a ceramic crown to be mounted thereon. The imprint is generally taken by using silicon impression materials. A stone model (or cast) is manufactured by using the imprint. A dental crown can then be fabricated by using the stone model.

Recently, the introduction of dental computer aided design/computer aided manufacturing ("CAD/CAM") technology has enabled dental practitioners and laboratory personnel to design and manufacture dental ceramic crowns digitally. A three-dimensional ("3D") digital image of a prepared tooth can be obtained by using an optical scanner pointed to the prepared tooth. This image can then be used to create a 3D model of a ceramic crown by using CAD technology (e.g., a 3D file containing a 3D model of the ceramic crown). The 3D model of the crown can be used to manufacture a dental ceramic crown by using CAM technology. The manufactured crown can be installed (e.g., cemented) on the prepared tooth.

Alternatively, a 3D model of a ceramic crown can be obtained by preparing a ceramic crown, using conventional manufacturing technology, and then three-dimensionally scanning the previously prepared crown. The 3D model of the ceramic crown can then be used to manufacture a ceramic crown for attachment to a prepared tooth of a patient.

One of the advantages of CAD/CAM technology is time savings because it enables a crown to be fabricated and mounted on a prepared tooth in the same day (e.g., while a patient waits for the crown to be produced after having scanned the prepared tooth). This process can also reduce the total cost of producing a dental crown by eliminating the need to create a stone model of the tooth. In addition, a crown produced by using CAD/CAM technology can be durable and well-fitting. For these reasons, the use of CAD/CAM technology in fabricating ceramic crowns is rapidly growing and widely replacing the traditional process of manufacturing ceramic crowns.

The process of creating a ceramic crown by using CAM technology includes obtaining a ceramic block, which is typically attached to a mandrel or a holder from an underside of the ceramic block, inserting the block with the holder in a milling machine, securing the holder to the milling machine to make the ceramic block immobile, and performing a milling process on the immobile ceramic block. The milling process mills (or grinds) the ceramic block to produce a ceramic dental crown.

The ceramic block and the holder are typically provided (e.g., sold) as one integrated piece by various manufacturers. In other words, the holder and the ceramic block, typically, are permanently attached to one another. Once that the block is used (e.g., milled), the holder and any excess ceramic material still attached to the holder are typically discarded. The discarding of the holder and/or excess ceramic material is wasteful.

Occasionally, certain manufacturers produce ceramic blocks without a holder. In this case, different entities that operate ceramic block milling machines can attach a specially designed holder (that will best fit the manufacturers' respective milling machines) to each ceramic block in order to attach each ceramic block, via its holder, to a milling machine. However, the process of attaching the separately-sold ceramic blocks to the necessary holders is complex, thereby increasing the manufacturing cost of a ceramic crown. In addition, the attachment process often results in a permanent bond between the separately-sold ceramic block and the holder, with the result being that the holder and any excess ceramic material remaining thereon after the milling process must be discarded. This configuration is also wasteful.

SUMMARY

A dental system of the present disclosure includes a reusable dental block holding assembly and a ceramic block. Particularly, the reusable holding assembly and the ceramic block have a structural configuration enabling the two parts to be selectively coupled to one another and selectively uncoupled from one another.

When the dental block holding assembly and the ceramic block are selectively coupled to one another, the holding assembly, as a unit, can be connected to a milling machine. The milling machine can be used to mill (or grind) by the ceramic block to form a dental crown.

The formed dental crown and the holding assembly can be removed from the milling machine. Then, the dental crown can be selectively uncoupled from the holding assembly. The holding assembly can then be reused to selective receive another ceramic block that can be milled to form another dental crown.

The coupling mechanism between the reusable holding assembly and a ceramic block may include a slot (or a receiving cavity) with a three-dimensional shape in one of the holding assembly and the ceramic block. The other component, from among the holding assembly and the ceramic block, may include a protrusion with a three-dimensional shape and size that matches the shape and size of the slot. This configuration enables the reusable block and a crown to be coupled to one another by inserting the protrusion in the slot.

A selective locking mechanism including a fastener (e.g., a screw) and a plate may be used to selectively secure the protrusion of the ceramic block inside of the slot. This configuration ensures that the ceramic block will not move relative to the holding assembly during the milling process. The selective locking mechanism can be unlocked after the milling process is complete such that the dental crown formed by the milling process can be uncoupled from the holding assembly.

BRIEF DESCRIPTION OF THE DRAWINGS

The above and other features of the present disclosure will become more apparent by describing in detail exemplary embodiments thereof in conjunction with the accompanying drawings, in which.

DETAILED DESCRIPTION OF THE EMBODIMENTS

Figure 1:
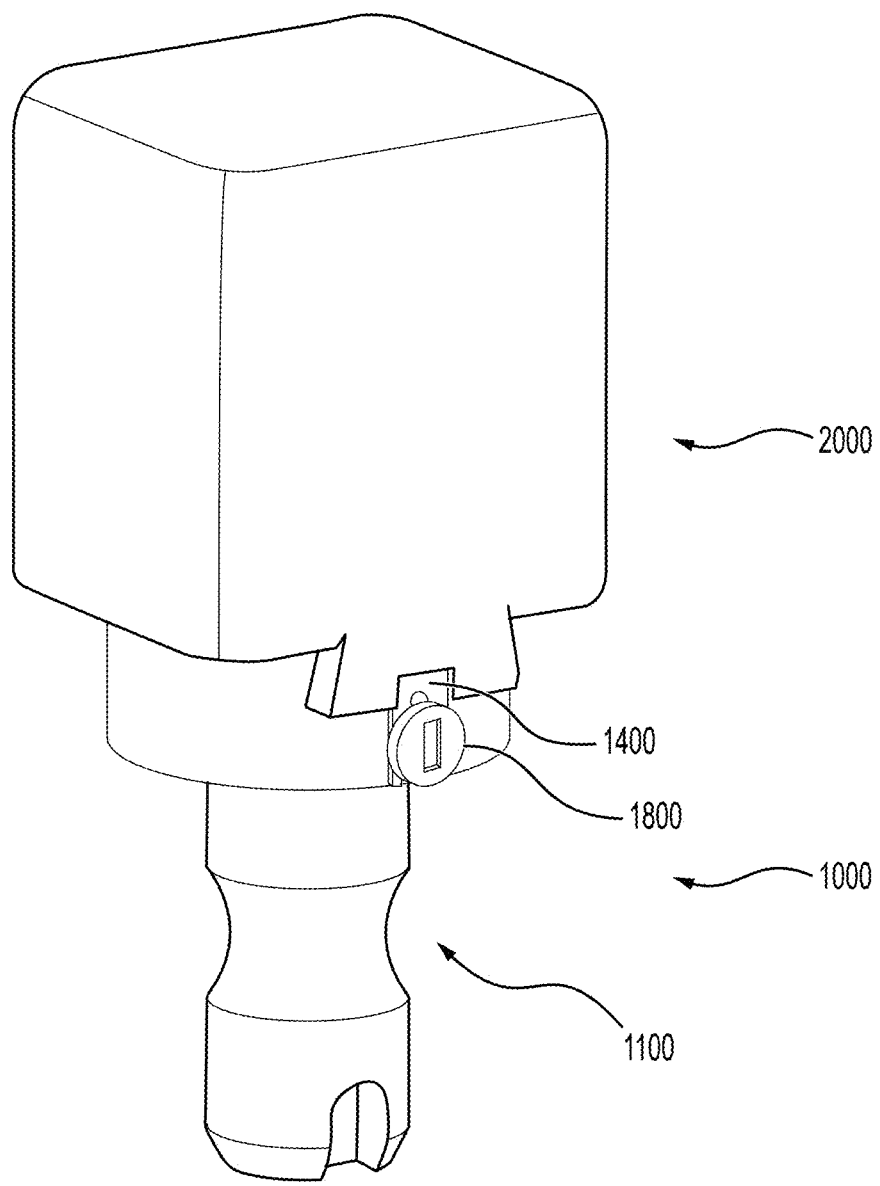
FIG. 1 is a perspective view illustrating a dental block holding assembly and a ceramic block selectively coupled to the dental block holding assembly according to an embodiment of the present disclosure.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

FIGS. 1-15 illustrate a dental system of the present disclosure. The dental system of FIGS. 1-15 includes a dental block holding assembly 1000 and a ceramic block 2000 that are selectively coupleable to one another and selectively uncoupleable from one another.

The dental block holding assembly 1000 may include a holder 1100, a plate 1400 and a fastener 1800. The fastener 1800 is configured to selectively connect the plate 1400 to the holder 1100. When the ceramic block 2000 is selectively coupled to the holder 1100, the plate 1400 and the fastener 1800 can be used to securely affix the ceramic block 2000 to the holder 1100 such that the ceramic block 2000 does not move relative to the holder 1100 during a milling operation.

Figure 5:
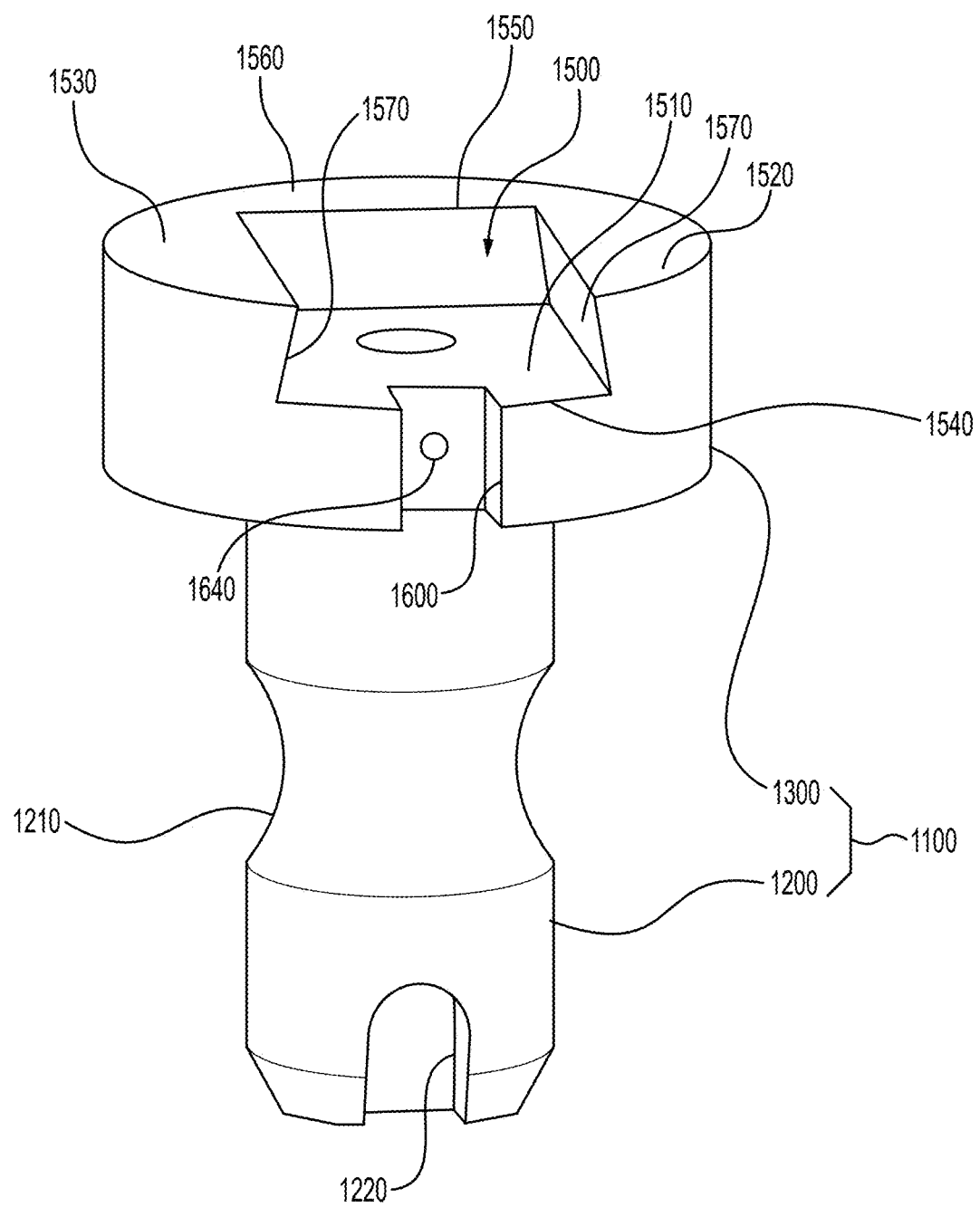
FIG. 5 is a perspective view illustrating a dental block holder of the dental block assembly of FIG. 1.
Figure 6:
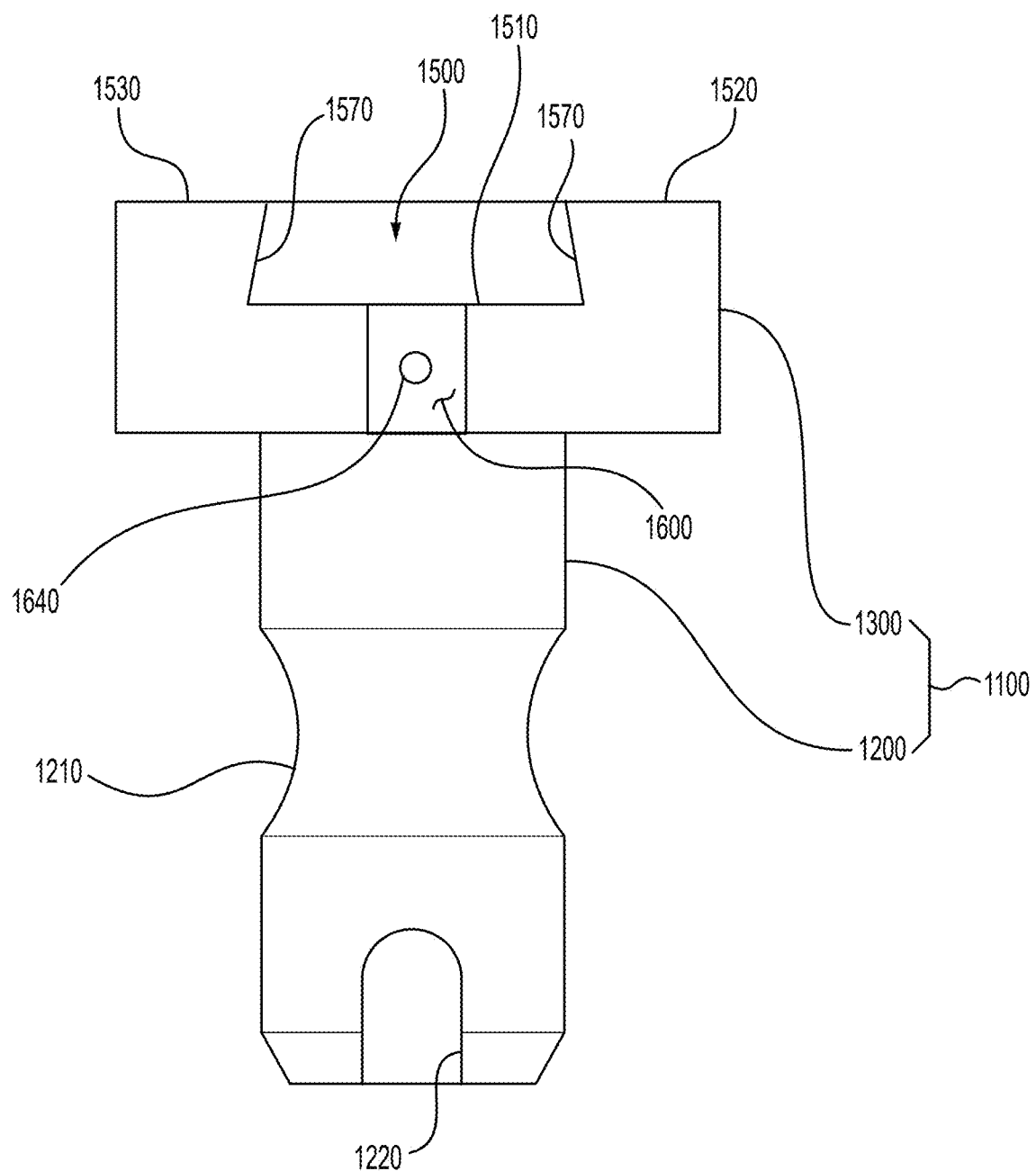
FIG. 6 is a front side view illustrating the dental block holder of the dental block assembly of FIG. 1.
Figure 7:
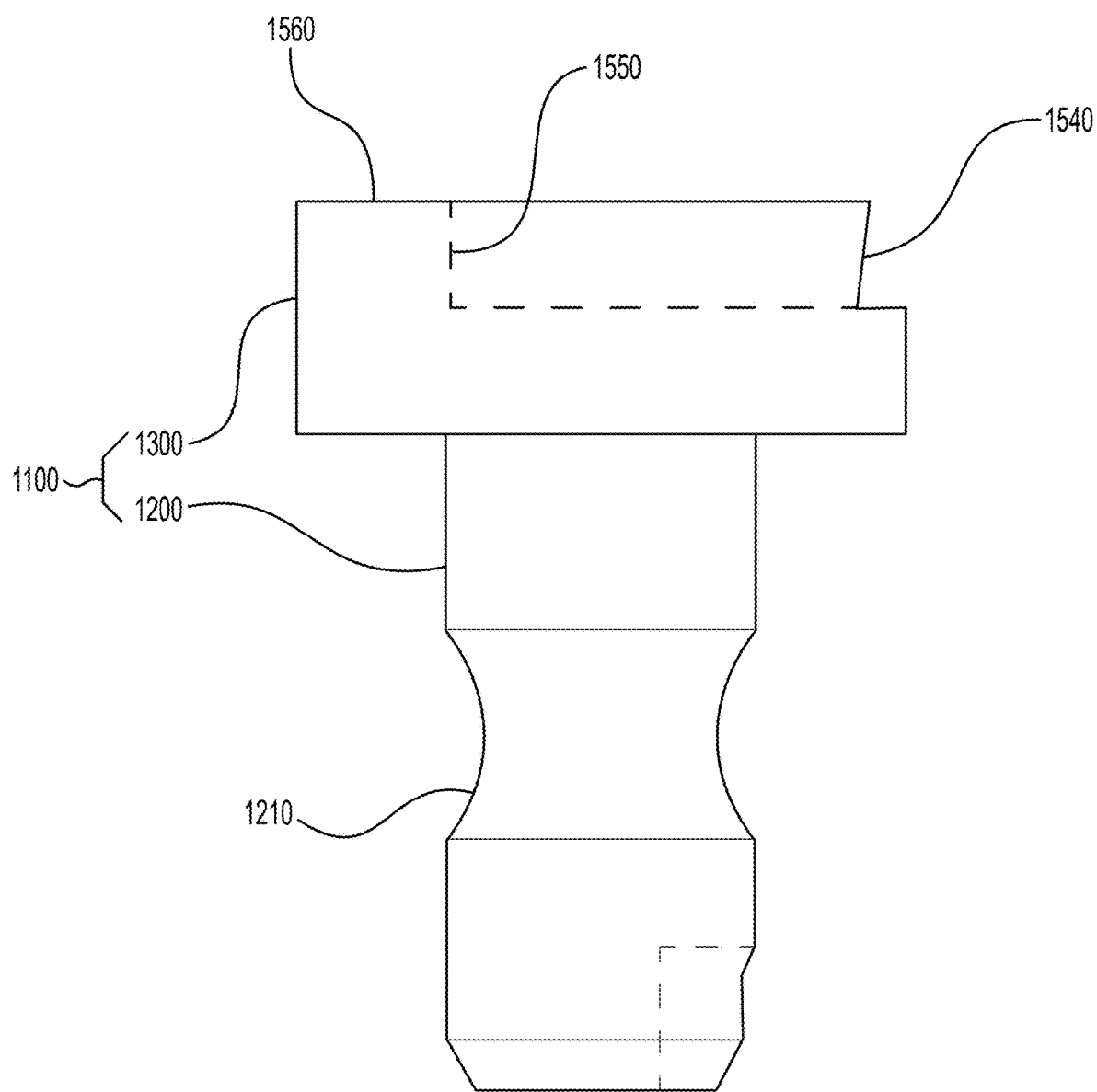
FIG. 7 is a right side view illustrating the dental block holder of the dental block assembly of FIG. 1.

Referring to FIGS. 5-7, the holder 1100 may include an elongated connecting member (e.g., a post) 1200 and a holding component 1300 connected to the post 1200. The post 1200 is configured to be selectively connected to a milling machine so that the dental block holding assembly 1000 is affixed with the ceramic block 2000 inside of the milling machine.

Since different milling machines may have different post 1200 fitment specifications (e.g., specifications defining the shape and size of a post), the post 1200 of the present disclosure may be variously configured to fit any desired milling machine based on the fitment specifications of the particular milling machine being used. In a non-limiting configuration, as illustrated in FIGS. 5-7, the post 1200 includes an elongated round bar shape with an annular circumferential recess 1210 and a notch 1220 at an end that is opposite to the holding component 1300 (e.g., on its lower end). The post 1200, as illustrated in FIG. 1, is configured to be coupleable with certain milling machines bearing the trademark CERAMILL MOTION, owned by Amann Girrbach AG.

The holding component 1300 is configured to be selectively coupleable with the ceramic block 2000 due to the structural configuration of the holding component 1300 and the structural configuration of the ceramic block 2000.

For example, with reference to FIGS. 5-6, the holding component 1300 may include a slot 1500 (or a receiving cavity or a receiving region) therein, and the post 1200 may be connected to a region of the holding component 1300 other than where the slot 1500 is disposed. For example, the region of the holding component 1300 that includes the slot 1500 might not overlap the exterior region of the holding component 1300 where the slot 1500 is located. In other words, the region of the holding component 1300 where the post 1200 is connected is configured to avoid interfering with the coupling and uncoupling process between the holding component 1300 and the ceramic block 2000 via the slot 1500.

For example, and as illustrated in FIGS. 5-6, the slot 1500 and the post 1200 may be disposed on opposing ends of the holding component 1300. However, the present disclosure is not limited to this configuration. For example, the slot 1500 and the post 1200 may be disposed on other ends or side surfaces of the holding component 1300, including adjacent side surfaces of the holding component 1300 or side surfaces of the holding component 1300 that are not adjacent to one another.

The slot 1500 is configured to selectively receive a protruding mating component 2100 of the ceramic block 2000 (see FIG. 8) inside in order to selectively couple the holder 1100 and the ceramic block 2000 to one another. Referring to FIGS. 5-6, the slot 1500 may include a base 1510, first and second elongated guide members 1520, 1530 protruding from the base 1510 and extending along the base 1510 in a first direction (e.g., in a front to back direction when the holder 1100 is aligned as illustrated in FIG. 5), the first and second elongated guide members 1520, 1530 being separated from one another, the first and second elongated guide members 1520, 1530 defining a front opening 1540 (see FIG. 7) of the slot 1500 (that may be referred hereinafter as an "opening" of the slot 1500) and a rear end 1550 of the slot 1500, opposite to the opening 1540. The slot 1500 may also include a third elongated member 1560 protruding from the base 1510 and connecting the first and second elongated guide members 1520, 1530 to one another at the rear end 1550 of the slot 1500. For example, the third elongated member 1560 may extend in a second direction that crosses the first direction.

As illustrated in FIGS. 5-7, the base 1510 may extend inwardly from a vertical exterior surface of the holding component 1300 (when the holding component 1300 is arranged substantially vertically as illustrated in FIGS. 5-7).

As illustrated in FIGS. 5-6, the first and second elongated guide members may each include a surface 1570 projecting on the base 1510 (or overlapping the base 1510). This configuration of the first and second elongated guide members 1520, 1530, in combination with the base 1510 of the slot 1500, enables the protruding mating component 2100 of the ceramic block 2000 to be slid inside of the slot 1500 from the front opening 1540 of the slot 1500.

Figure 2:
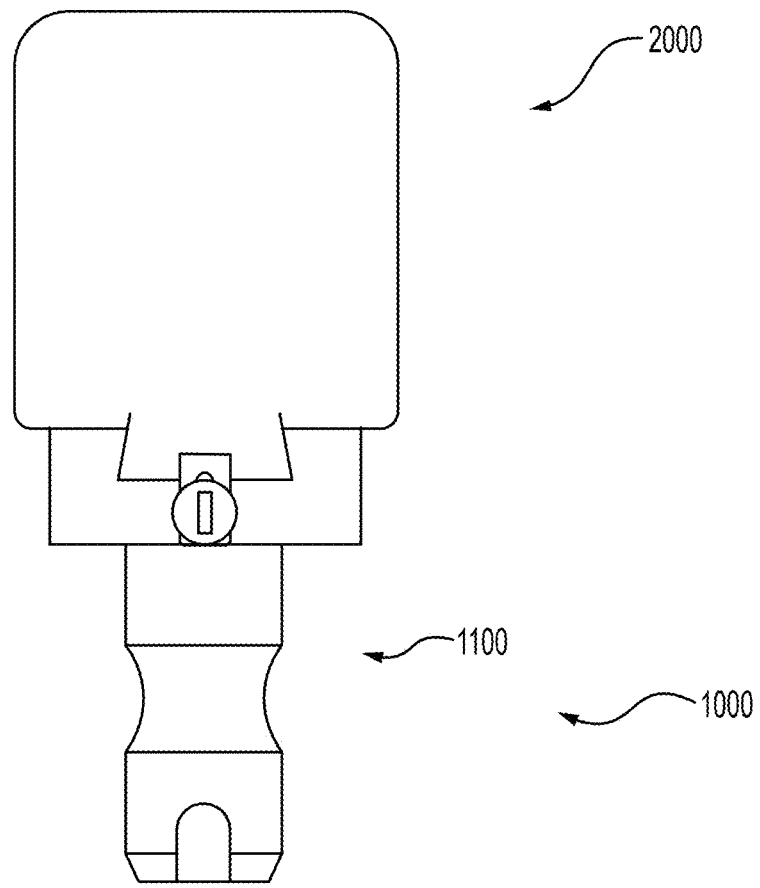
FIG. 2 is a front side view of the dental block holding assembly and ceramic block of FIG. 1.
Figure 3:
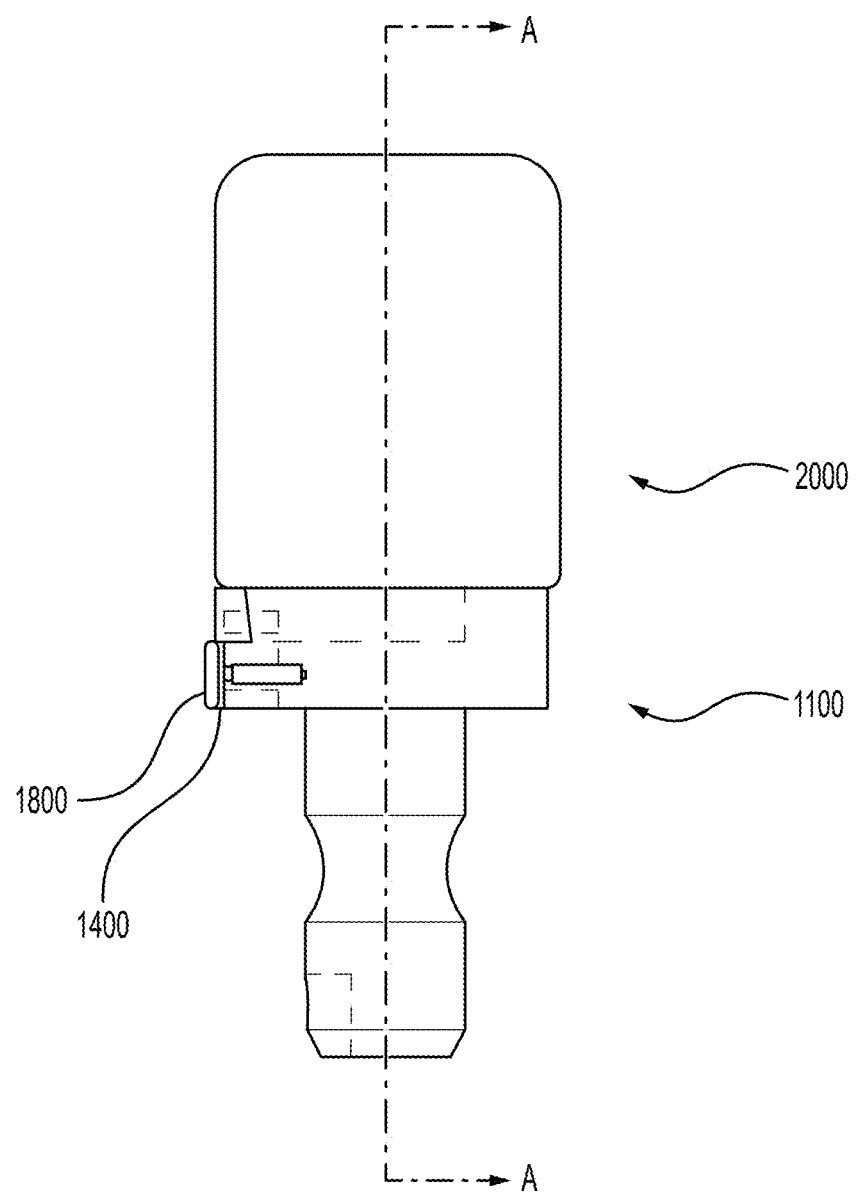
FIG. 3 is a left side view of the dental block holding assembly and ceramic block of FIG. 1.
Figure 4:
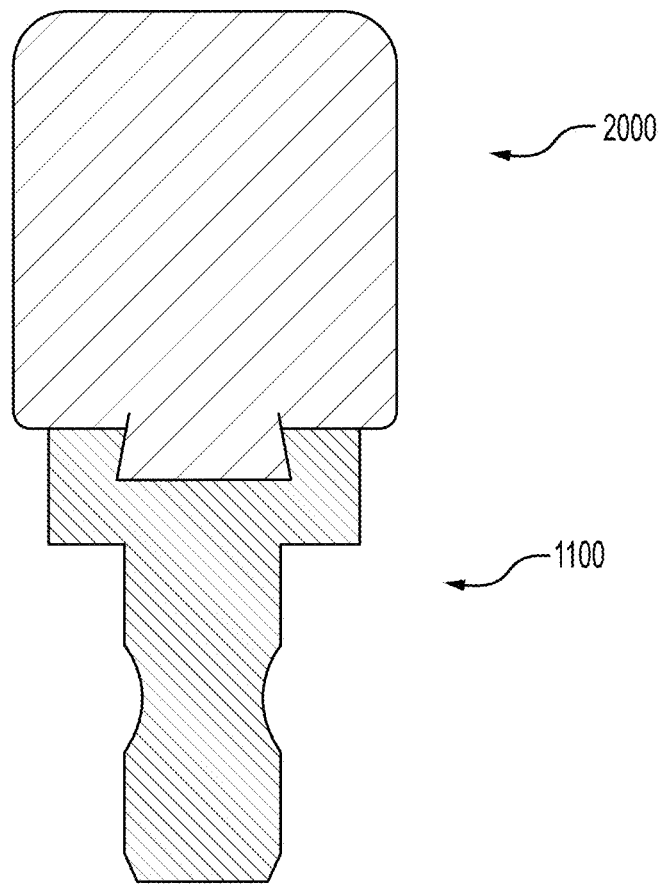
FIG. 4 is a cross-sectional view taken along line A-A of FIG. 3.

In addition, the configuration of the first and second elongated guide members, in combination with the base 1510, may prevent movement of the ceramic block 2000, relative to the holder 1100, in a top-to-bottom direction when the holder 1100 is oriented substantially vertically, as illustrated in FIGS. 1-7. In other words, the projecting surfaces 1570 of the first and second elongated guide members 1520, 1530, in combination with the base 1510, prevent movement of the ceramic block 2000 in a direction toward the post 1200 or away from the post 1200. In addition, as illustrated in FIGS. 1-7, the first and second elongated guide members 1520, 1530 prevent the protruding mating component 2100 of the ceramic block 2000 from being moved in a left-to-right direction when the holder 1100 is oriented substantially vertically, as illustrated in FIGS. 1-3.

The third elongated member 1560 is configured to prevent further inward movement of the mating component 2100 of the ceramic block 2000 inside of the slot 1500 when the mating component 2100 of the ceramic block 2000 is moved inwardly inside of the slot 1500 via the opening 1540 to couple the ceramic block 2000 with the holder 1100.

The holder 1100 may include, for example, a metal. The metal may have, for example, a property that resists staining (e.g., rusting). For example, the metal may include stainless steel, titanium, etc. However, other metals and/or metal alloys may also be used to form the holder 1100.

The ceramic block 2000 may include one or more ceramic material(s) that is/are suitable for constructing a dental crown. For example, the ceramic block 2000 may include porcelain.

Figure 8:
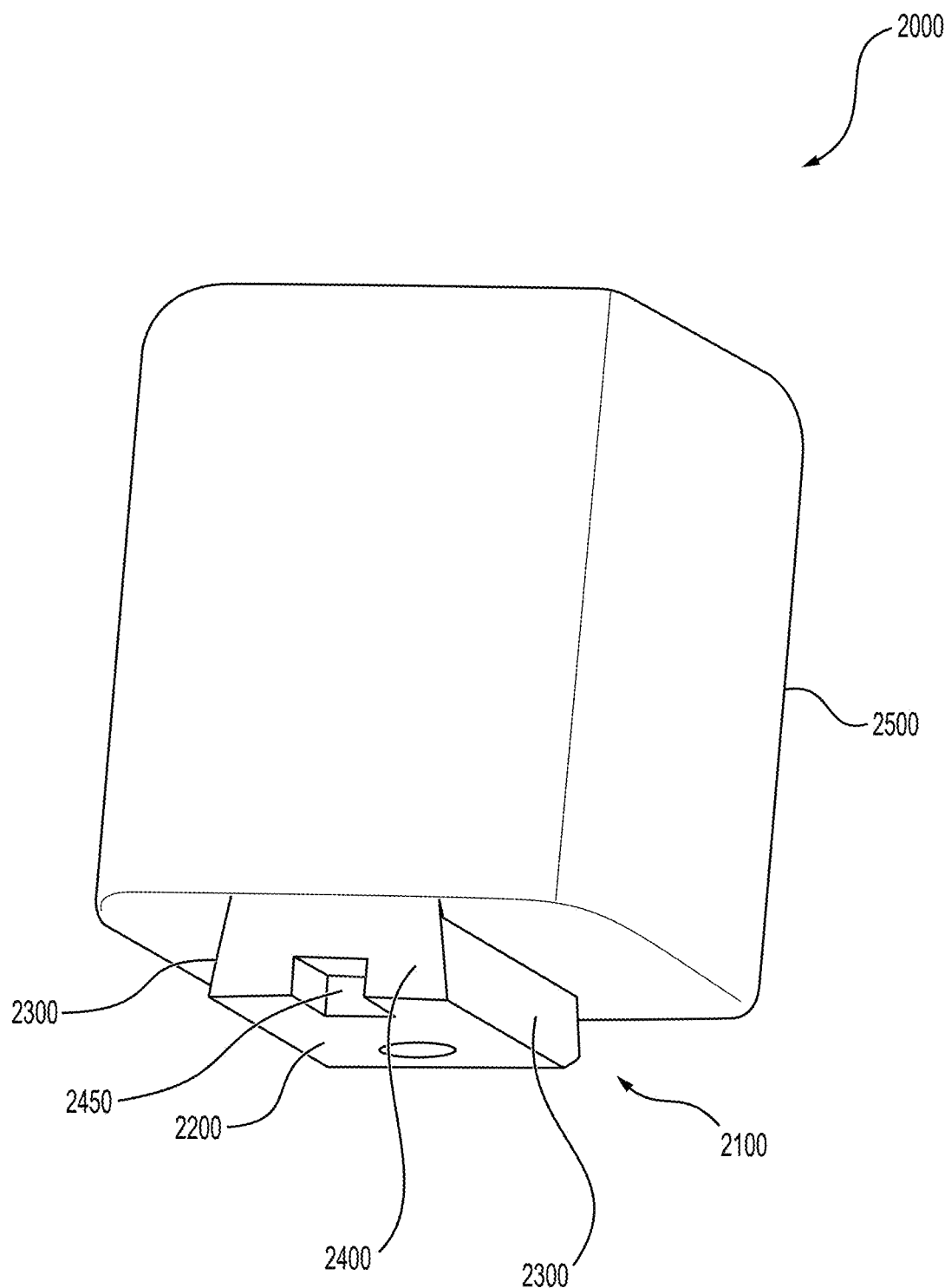
FIG. 8 is a perspective view illustrating the ceramic block of FIG. 1.
Figure 9:
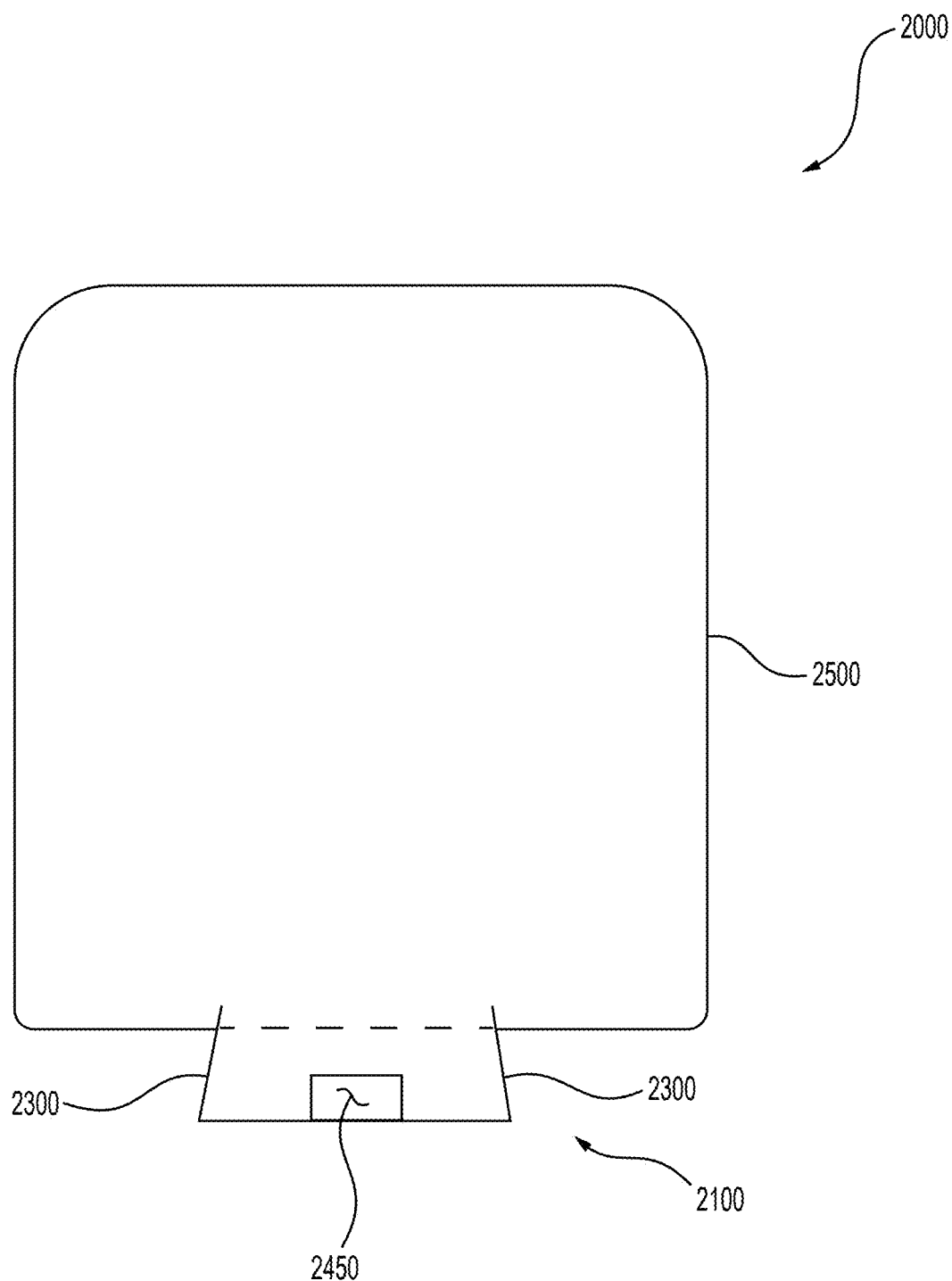
FIG. 9 is a front side view of the ceramic block of FIG. 1.
Figure 10:
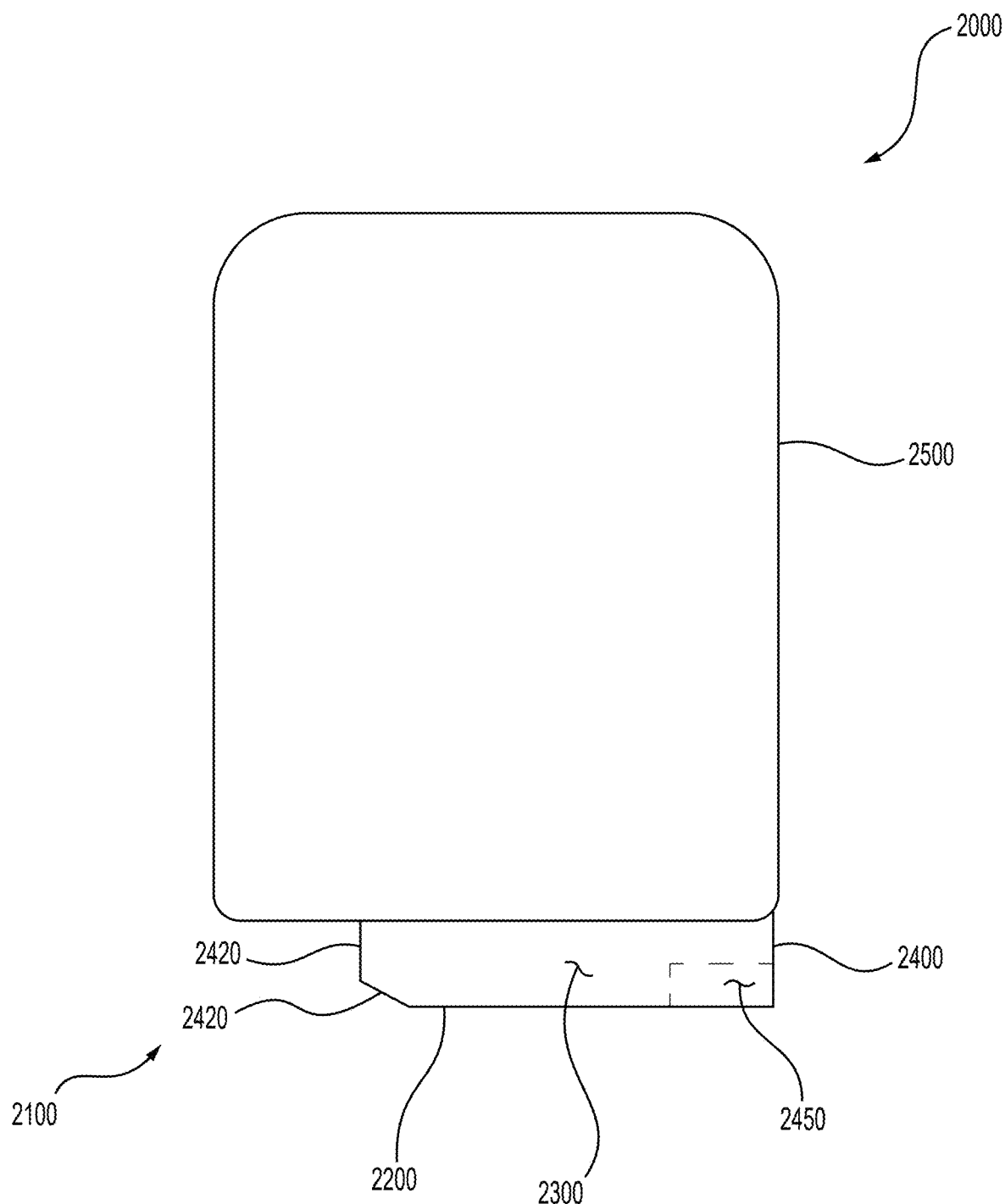
FIG. 10 is a right side view of the ceramic block of FIG. 1.

Referring to FIGS. 8-10, the ceramic block 2000 may include a millable component 2500 and the mating component 2100 protruding from the millable component 2500. The millable component 2500 may have, for example, a block shape, a brick-like shape, or, more generally, a blank shape, that can be milled to form a ceramic crown for a dental patient.

As illustrated in FIGS. 8-10, the mating component 2100 of the ceramic block 2000 may have a shape and/or size complementing the shape and/or size of the slot 1500 of the holder 1100. This configuration facilitates the coupling of the holder 1100 and the ceramic block 2000 by selectively inserting the mating component 2100 into the slot 1500.

For example, the mating component 2100 may include a base 2200 (e.g., a bottom side surface, when oriented as illustrated in FIG. 8), a top (e.g., a top side surface connected to the millable component 2500, opposite to the base 2200), a pair of side surfaces 2300 connecting the base 2200 and the top to one another on the left and right sides of the mating component 2100 (e.g., when the mating component 2100 is oriented as illustrated in FIG. 8), a front side surface 2400 connecting the base 2200 and the top to one another, and one or more rear side surfaces 2420 (see FIG. 10) connecting the base and the top to one another.

Referring to FIGS. 8-10, the mating component 2100 may also include a notch 2450 extending through the base 2200 and the front side surface 2400. However, the present disclosure is not limited to this configuration. For example, the notch 2405 may also be removed.

As illustrated in FIG. 8, the top of the mating component 2100 of the ceramic block 2000 may be narrower (or smaller) than the base 2200 thereof due to the inclination of the left and right side surfaces 2300 of the mating component 2100 of the ceramic block 2000.

When the ceramic block 2000 is selectively coupled to the holder 1100 via the slot 1500, the left and right side surfaces 2300 of the mating component 2100 of the ceramic block 2000, respectively, may be configured to rest against (or be structurally supported by) the surfaces 1570 of first and second elongated guide members of slot 1500. In this configuration, the rear side surface(s) 2420 of the mating component 2100 of the ceramic block 2000 may be configured to rest against (or be structurally supported by) the third elongated member 1560 of the slot 1500, and an inner side surface of the notch 2450 may be configured to rest against (or be structurally supported by) the plate 1400 of the holder 1100 assembly. When there is no notch 2450, the front side surface 2400 of the mating component 2100 of the ceramic block 2000 may be configured to rest against (or be structurally supported by) the plate 1400 of the holder 1100 assembly.

The fastener 1800 of the holding assembly 1000 is configured to selectively affix (or lock) the ceramic block 2000 to the holder 1100 when the ceramic block 2000 is selectively coupled to the holder 1100 via the slot 1500.

Figure 12:
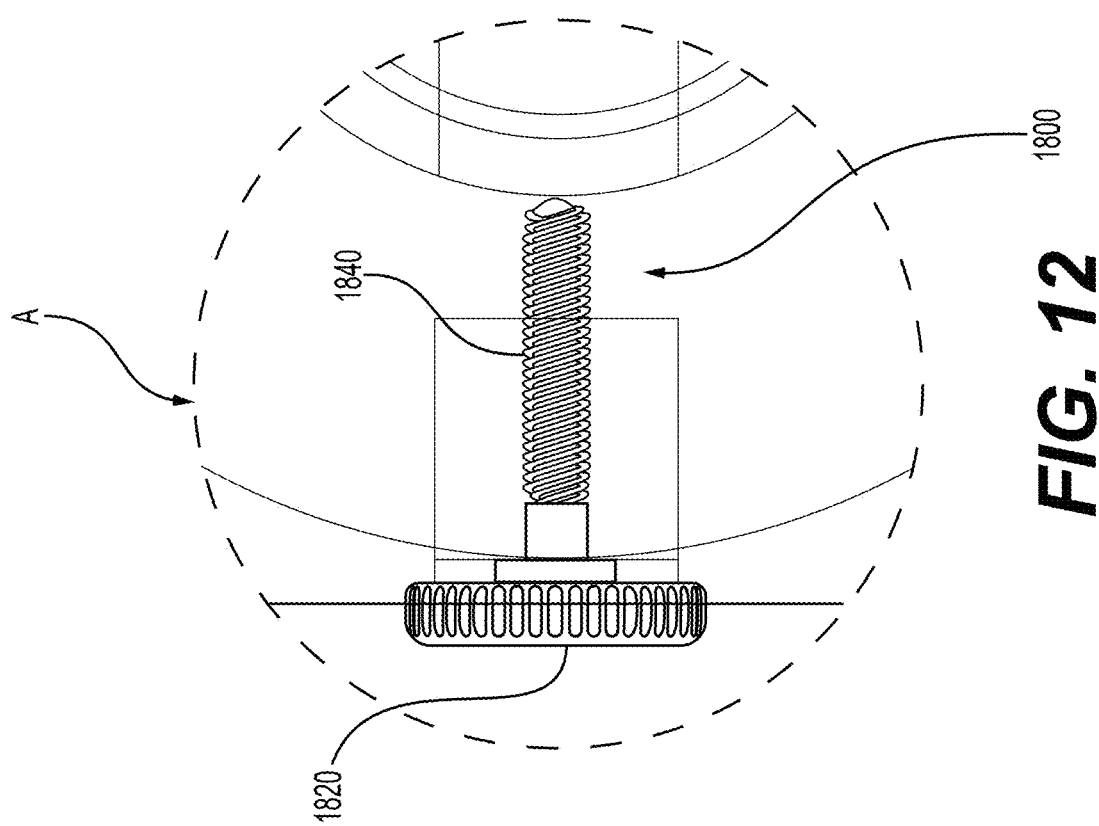
FIG. 12 is a magnified view of a region A of FIG. 11.
Figure 11:
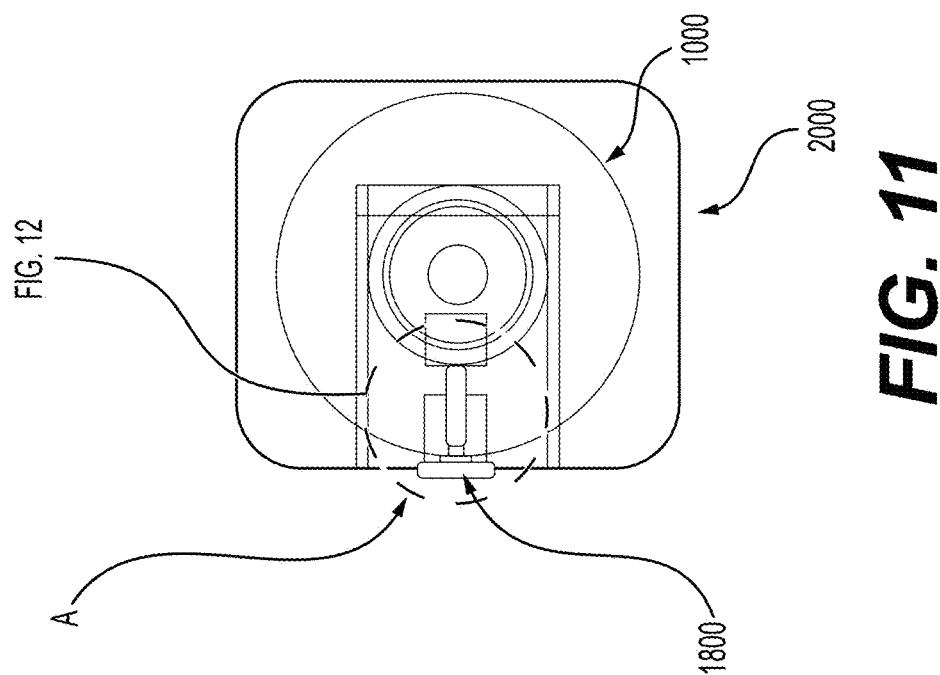
FIG. 11 is a bottom side view of the dental block holding assembly and the ceramic block of FIG. 1.
Figure 14:
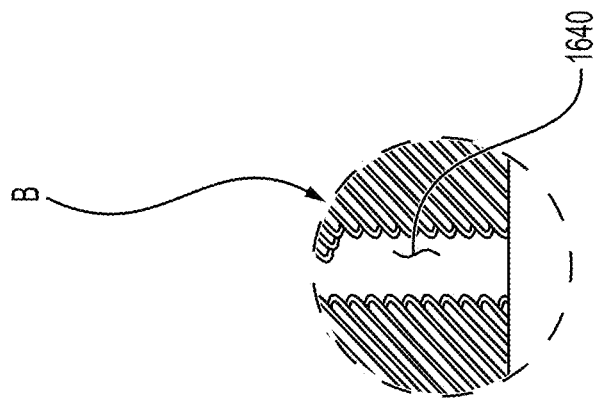
FIG. 14 is an a magnified view of a region B of FIG. 13.

For example, with reference to FIGS. 11-12, the fastener 1800 may include a screw. The screw may include a screw head (or head portion) 1820 and an elongated threaded body 1840 extending from the screw head 1820.

Figure 13:
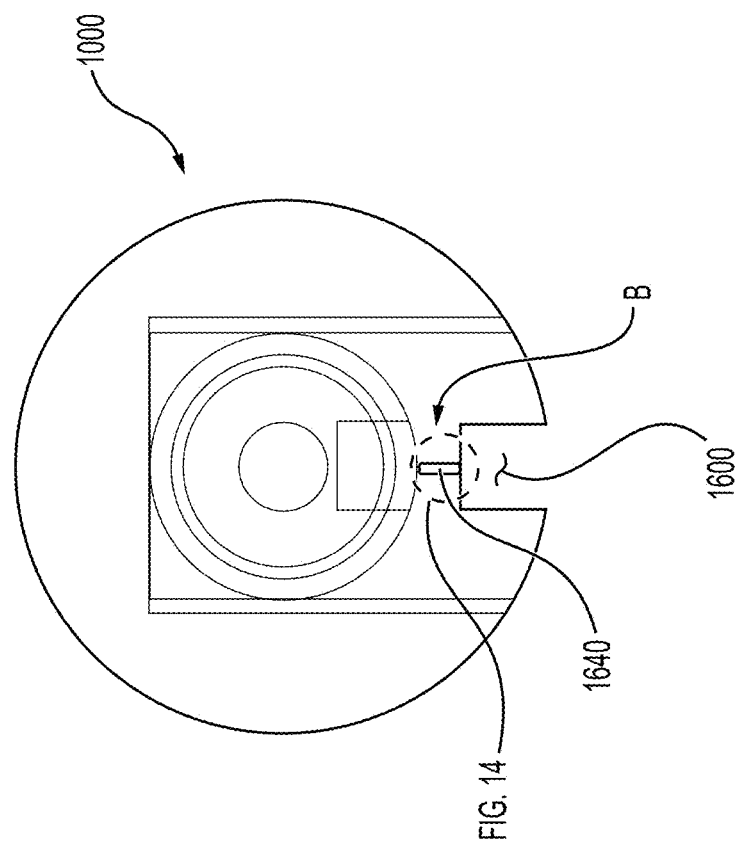
FIG. 13 is a bottom side view of the dental block holder of the dental block holding assembly of FIG. 1.

Referring to FIGS. 5, 6 and 13, the holding component 1300 of the holder 1100 may include a recess 1600 (or notch) extending inwardly from a front exterior surface thereof. The recess 1600 may be disposed under the slot 1500 when the holder 1100 is aligned substantially vertically as illustrated in FIG. 5). In addition, the holding component 1300 of the holder 1100 may include an elongated threaded cavity 1640 extending inwardly from a rear side surface of the recess 1600.

The elongated threaded cavity 1640 is configured to accommodate the elongated threaded body 1840 of the screw therein (e.g., by screwing the elongated threaded body 1840 of the fastener 1800 in the elongated threaded cavity 1640) in order to selectively connect the fastener 1800 with the holder 1100.

Figure 15:
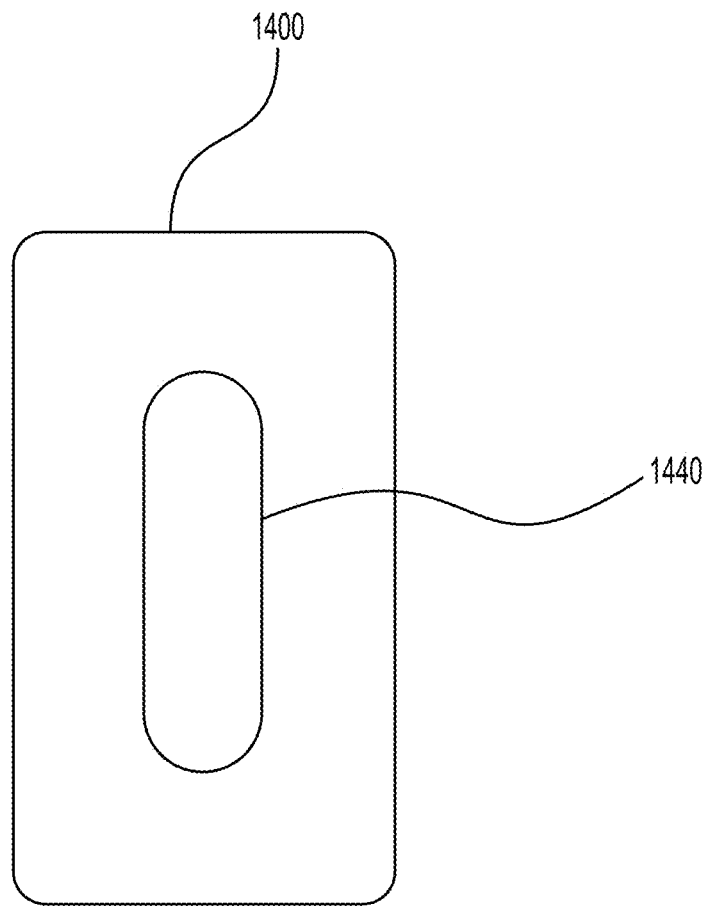
FIG. 15 is a front view of a plate included in the dental block holding assembly of FIG. 1.

Referring to FIG. 15, the plate 1400 may have a through opening 1440 (which may be elongated) enabling the elongated threaded body 1840 of the fastener 1800 to extend through the plate 1400. This way, the elongated threaded body 1840 of the screw can pass through the plate 1400, and be selectively connected to the holder 1100 via the elongated cavity 1640. In this configuration, and when the mating component 2100 of the ceramic block 2000 is inserted in the slot 1500, the screw head 1820 is configured to press the plate 1400 against the inner side surface of the notch 2450 (or against the front side surface 2400 of the mating component 2100 when there is no notch 2450) in order to secure the ceramic block 2000 in the slot 1500.

For example, the screw can be tightened as needed to ensure a secure connection between the ceramic block 2000 and the holder 1100 such that the ceramic block 2000 does not become loose on the holder 1100 during a milling process of the ceramic block 2000. The plate 1400 can have a thickness of a sufficient magnitude such that the plate 1400, in the thickness direction (or front to back direction), can extend throughout the entire recess 1600 in the holder 1100 in order to enable the screw head 1820 to make contact with the plate 1400 in order to press the plate 1400 against the mating component 2100 of the ceramic block 2000.

This configuration enables the dental block holding assembly 1000 and the ceramic block 2000 of the present disclosure to be selectively and securely coupled to one another, and, as a unit, to be selectively and securely coupled to a milling machine.

For example, a holder 1100 of the present disclosure may be obtained (or received). A ceramic block 2000 of the present disclosure may also be obtained. The holder 1100 and the ceramic block 2000 may be selectively coupled to one another, as described in this specification, and may be affixed to one another by using the fastener 1800 and the plate 1400. The connected holding assembly 1000 and the ceramic block 2000, as a unit, may be selectively coupled to a milling machine. The milling machine may be used to performing a milling operation on the ceramic block 2000. The milling operation may be configured to mill the ceramic block 2000 to form a dental crown.

After the milling process is complete, the holding assembly 1000 and the ceramic block 2000, as a unit, may be selectively uncoupled from the milling machine. Then, the fastener 1800 may be selectively uncoupled from the holder 1100, for example, by unscrewing the fastener 1800 from the holder 1100. The formed crown may then be removed from the holder 1100. The holding assembly 1000 may then be reused with an additional (e.g., a new) ceramic block 2000 to produce an additional dental crown.

The configuration of the dental system of the present disclosure enables a dental block holding assembly 1000 to be reused numerous times for manufacturing a large number of ceramic dental crowns. This, in turn, reduces the cost of manufacturing a ceramic crown by avoiding the cost associated with producing a separate and discardable holder 1100 for each ceramic block 2000. In addition, the configuration of the dental system of the present disclosure eliminates the cost, time and labor associated with permanently attaching each discardable holder 1100 to its respective ceramic block 2000. Moreover, the reusable configuration of the dental holder 1100 of the present disclosure reduces waste because the holder 1100 assembly of the present disclosure need not be discarded after being used.

While the fastener 1800 of the holding assembly 1000 is exemplarily illustrated as being a screw, the present disclosure is not limited to this configuration. Other coupling mechanisms may be used to prevent the ceramic block 2000 from being uncoupled from the holder 1100 (e.g., from being slid out of the slot 1500) instead of or in addition to a screw. The other coupling mechanisms may include, for example, an extendable/retractable latch mechanism, a snap-on mechanism, etc., to selectively prevent the ceramic block 2000 from being slid out of the slot 1500.

In addition, while the slot 1500 and the mating component 2100 of the ceramic block 2000 are exemplarily illustrated as having matching trapezoidal prism shapes, the present disclosure is not limited to this configuration. The slot 1500 and the mating component 2100 of the ceramic block 2000 may have other three-dimensional shapes, which need not necessarily match one another in size and/or shape, so long as their respective shapes and/or sizes enable the slot 1500 and the mating component 2100 of the ceramic block 2000 to be selectively and securely coupled to one another.

Furthermore, the arrangement of the slot and the mating component may be reversed. For example, in an approach, a ceramic block may include a slot as described in this specification, and the holding assembly may include a protruding mating component as described in this specification. In this approach, the fastener may be configured to be received in the holding assembly, as described in this specification, or in the ceramic block.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A dental system, comprising:
a dental block holding assembly and a ceramic block that are selectively coupleable to one another and selectively uncoupleable from one another,
wherein the dental block holding assembly includes a holder, the holder including:
an elongated post configured to be received in a dental milling machine,
a holding component, and
a fastener configured to be selectively connected to the holding component of the holder,
wherein the holding component includes a first region connected to the elongated post and a second region including a slot, the second region of the holding component being different from the first region of the holding component,
wherein the ceramic block includes a millable component and a mating component protruding from the millable component,
wherein the mating component of the ceramic block is configured to be selectively received in the slot,
wherein the fastener includes a head portion and an elongated threaded body extending from the head portion,
wherein the holding component of the holder includes an elongated threaded cavity configured to receive the elongated threaded body of the fastener therein to selectively connect the fastener with the holder, and
wherein the elongated threaded body of the fastener is positioned to engage with the ceramic block.

2. The system of claim 1, wherein the slot includes:
a base;
first and second elongated guide members protruding from the base and extending along the base in a first direction, the first and second elongated guide members being spaced apart from one another, wherein the first and second elongated guide members define an opening of the slot and a rear end of the slot opposite to the opening thereof; and
a third elongated member protruding from the base and connecting the first and second elongated guide members to one another at the rear end of the slot.

3. The system of claim 2, wherein each one of the first and second elongated guide members includes a surface projecting on the base.

4. The system of claim 1, wherein the mating component of the ceramic block includes:
a base;
a top spaced apart from the base of the mating component, the top of the mating component being connected to the millable component;
a left side surface and a right side surface connecting the base and the top of the mating component to one another on opposite sides of the mating component;

a front side surface connecting the base and the top of the mating component to one another, and and a rear side surface connecting the base and the top to one another, wherein the left side surface and the right side surface connecting the base and the top of the mating component to one another, respectively, are configured to rest against the projecting surfaces of the first and second elongated guide members when the mating component of the ceramic block is selectively received in the slot.

5. The system of claim 1, wherein the mating component of the ceramic block has a shape matching a shape of the slot.

6. The system of claim 1, wherein the slot has a trapezoidal prism shape.

7. The system of claim 1, further comprising a plate with an opening therethrough, the plate being configured to be disposed between the head portion of the fastener and the holding component of the holder, with the elongated threaded body of the fastener extending through the through opening in the plate, when the holder and the fastener are selectively connected to one another.

8. A holding assembly for a dental system, the holding assembly comprising a holder, wherein the holder includes:
a post configured to be received in a dental milling machine,
a holding component, and
a fastener configured to be selectively connected to the holder,
wherein the holding component includes a first region connected to the elongated post and a second region including a slot, the first and second regions of the holding component not overlapping one another on an exterior of the holding component,
wherein the slot is configured to receive therein a mating component of a ceramic block,
wherein the fastener includes a head portion and an elongated threaded body extending from the head portion,
wherein the holding component of the holder includes an elongated threaded cavity configured to receive the elongated threaded body of the fastener therein to selectively connect the fastener with the holder, and
wherein the elongated threaded body of the fastener is positioned to engage with the ceramic block.

9. The holding assembly of claim 8 wherein the slot includes:
a base;
first and second elongated guide members protruding from the base and extending along the base in a first direction, the first and second elongated guide members being spaced apart from one another, wherein the first and second elongated guide members define an opening of the slot and a rear end of the slot; and
a third elongated member protruding from the base and connecting the first and second elongated guide members to one another at the rear end of the slot.

10. The holding assembly of claim 9, wherein each one of the first and second elongated guide members includes a surface projecting on the base.

11. The holding assembly of claim 9, wherein the slot has a trapezoidal prism shape.

12. The holding assembly of claim 8, further comprising a plate with an opening therethrough, the plate being configured to be disposed between the head portion of the fastener and the holding component of the holder, with the elongated threaded body of the fastener extending through the through opening in the plate, when the holder and the fastener are selectively connected to one another.

13. A method of operating a dental system, the method including:
receiving a dental block holding assembly;
receiving a ceramic block;
connecting the dental block holding assembly and the ceramic block to one another;
connecting the dental block holding assembly and the ceramic block, as a unit, to a milling machine; and
performing a milling operation on the ceramic block to form a dental crown,
wherein the dental block holding assembly includes a holder, the holder including:
an elongated post configured to be received in the milling machine, and
a holding component,
wherein the holding component includes a first region connected to the elongated post and a second region including a slot, the second region of the holding component being different from the first region of the holding component,
wherein the ceramic block includes a millable component and a mating component protruding from the millable component,
wherein the mating component of the ceramic block is configured to be selectively received in the slot,
wherein the connecting of the dental block holding assembly and the ceramic block to one another includes inserting the mating component of the ceramic block in the slot, and
wherein the dental block holding assembly further includes a and a plate,
wherein the fastener includes a head portion and an elongated threaded body extending from the head portion,
wherein the holding component of the holder includes an elongated threaded cavity configured to receive the elongated threaded body of the fastener therein to selectively connect the fastener with the holder,
wherein the plate includes an opening therethrough, the plate being configured to be disposed between the head portion of the fastener and the holding component of the holder, with the elongated threaded body of the fastener extending through the through opening in the plate, when the holder and the fastener are selectively connected to one another,
wherein the connecting of the dental block holding assembly and the ceramic block to one another further includes passing the elongated threaded body of the faster through the through opening in the plate and inserting the elongated threaded body of the fastener in the elongated threaded cavity, and
wherein the elongated threaded body of the fastener is positioned to engage with the ceramic block.

14. The method of claim 13, further comprising:
removing the dental block holding assembly and the formed dental crown, as a unit, from the milling machine; and
disconnecting the dental crown from the dental block holding assembly.

* * * * *